Patented Mar. 12, 1946

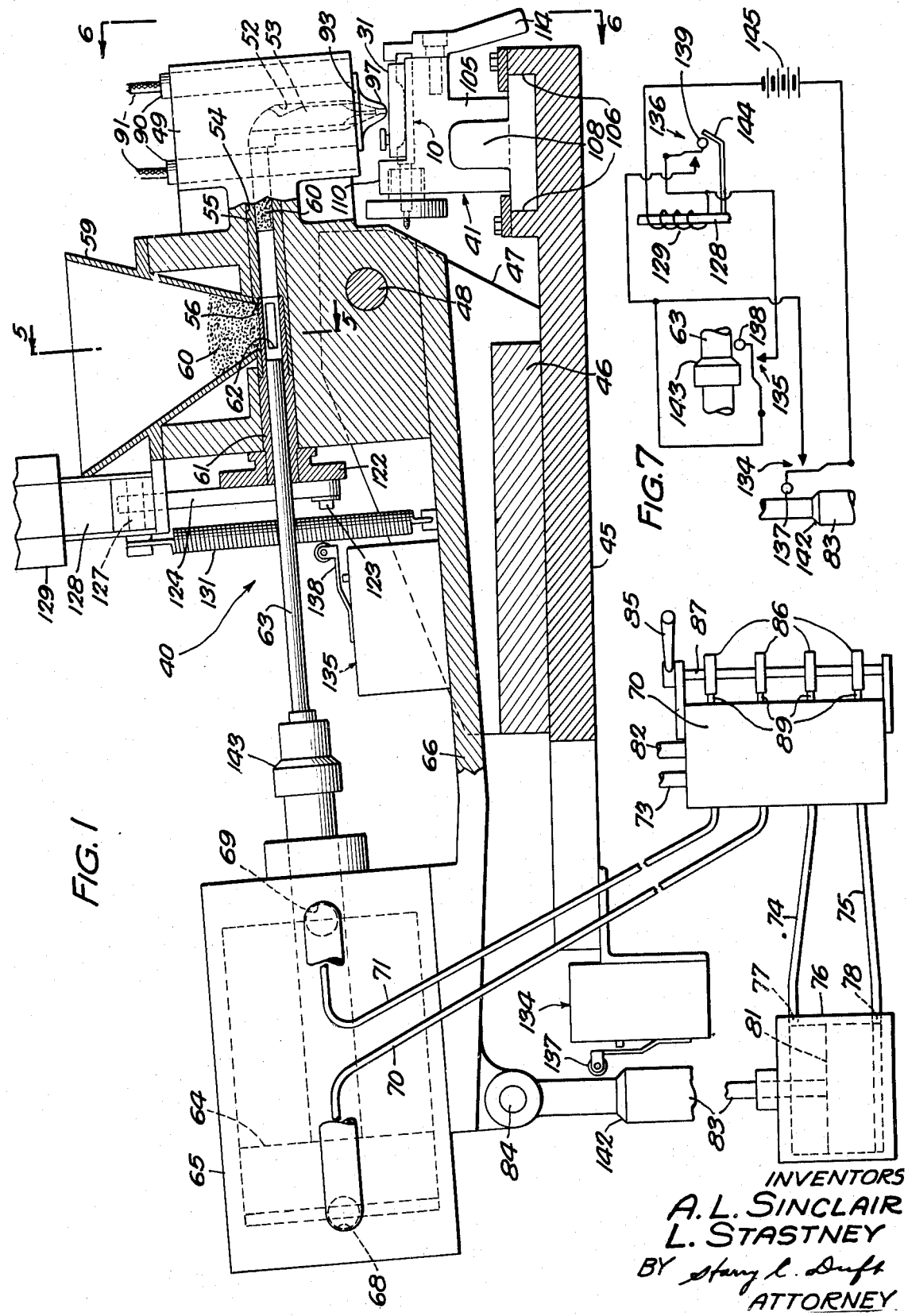

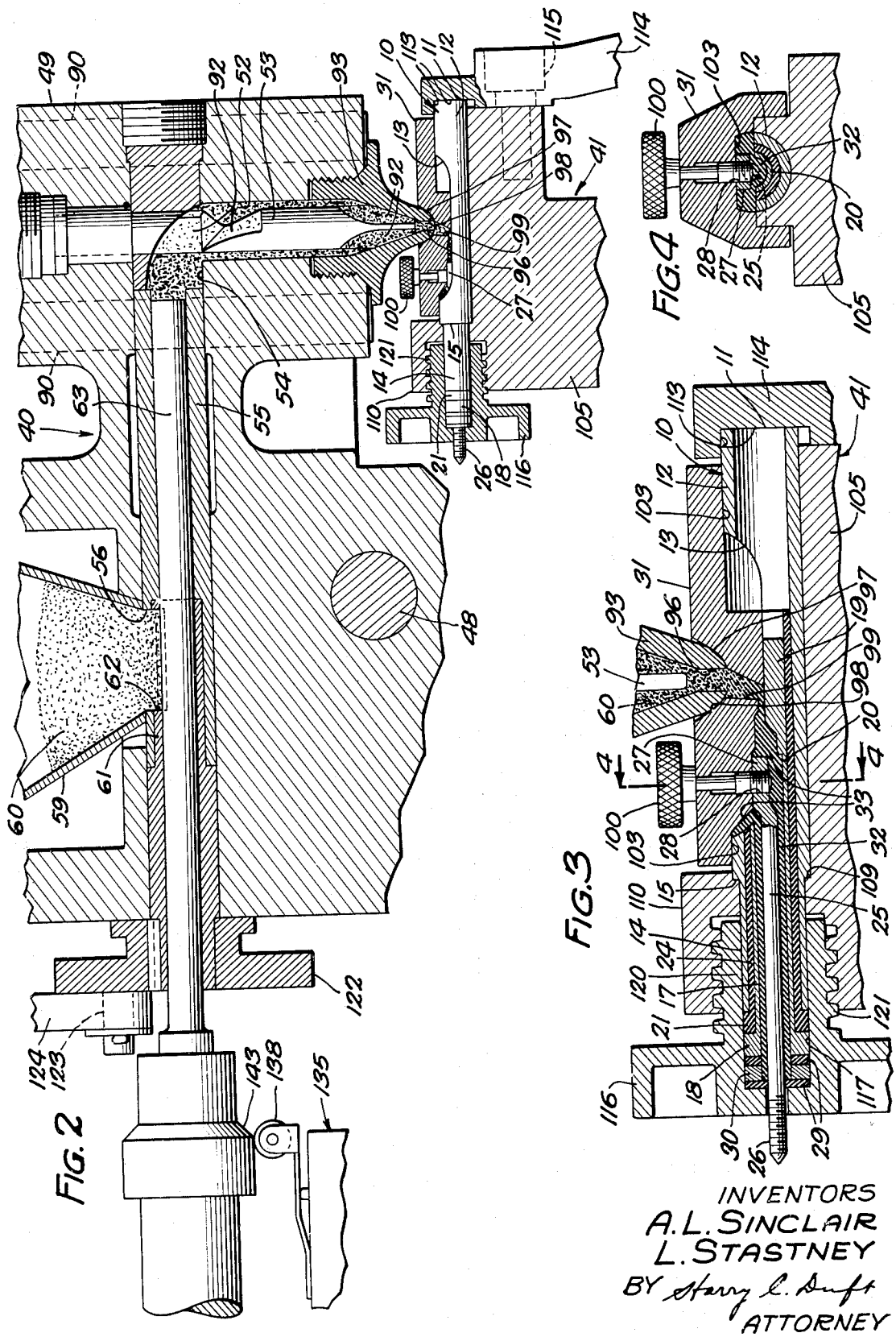

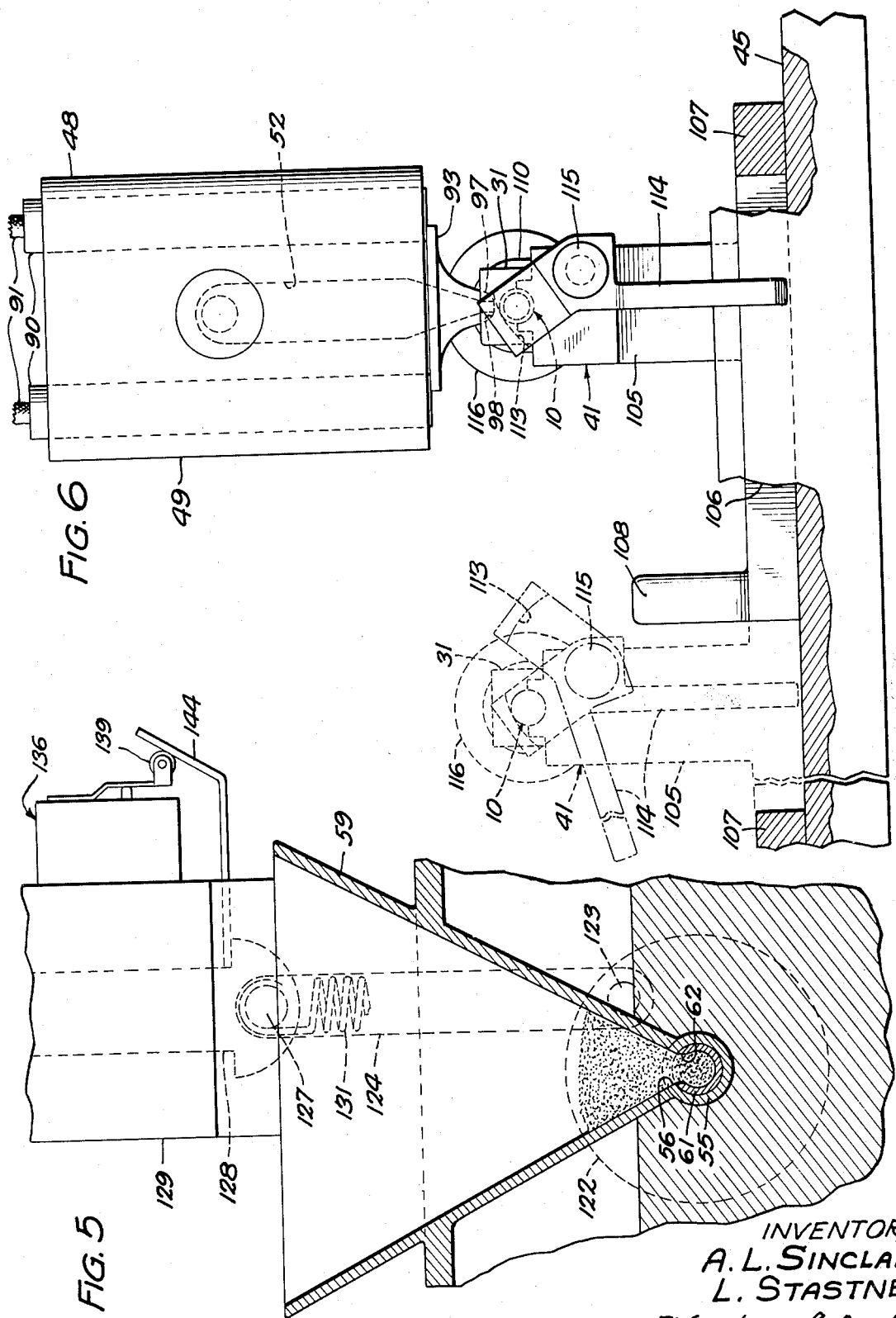

2,396,348

UNITED STATES PATENT OFFICE 2,396,348

EXTRUSION APPARATUS

Albert L. Sinclair, Chicago, and Ladislav Stastney, Cicero, Ill., assignors to Western Electric Company, Incorporated, New York, N. Y., a corporation of New York Application December 31, 1942, Serial No. 470,720

5 Claims. (Cl. 18—30)

This invention relates to extrusion apparatus and more particularly to an apparatus for feeding, extruding and molding thermoplastic materials between assembled parts.

An object of the invention is to provide an apparatus for efficiently and accurately feeding, extruding and molding thermoplastic material between assembled parts.

In accordance with one embodiment of the invention for use in the manufacture of electrical contact plugs for telephone switchboards, apparatus is provided for feeding, extruding and molding thermoplastic materials between spaced assembled conducting parts of the plug to insulate the same. Specifically, the apparatus comprises a pivotal and electrically heated extrusion head having a nozzle which, when in operative position, registers with an inlet opening of a die member removably secured to the plug which is held in a fixture, the die member directing the material extruded from the nozzle into position between the spaced assembled parts to be insulated and molding a finished surface on the material. Carried by the pivotal extrusion head is a hopper for feeding granular molding material into a laterally arranged aperture of an extrusion cylinder communicating with the nozzle, the material being deposited in the cylinder in advance of an air pressure actuated plunger. A rotatable sleeve surrounds the plunger and has an opening in its peripheral wall which is periodically registerable with the cylinder aperture and the hopper outlet, and, when so registered and with the plunger fully retracted, delivers a larger amount of granular material into the cylinder than is required for a single extruding operation. Since a small amount of material is extruded at each operation, the plunger will move closer to its extreme forward position with each extruding operation. Upon the plunger reaching the latter position, a pair of normally open limit switches automatically controlled by the movements of the plunger and pivotal head have been actuated to close a solenoid circuit. The energization of the solenoid serves, through the movement of its core, to rotate the sleeve and register its aperture with the cylinder aperture and hopper outlet. In the retraction of the plunger, the limit switch controlled thereby immediately opens, but the sleeve is maintained in its last actuated position through the continued energization of the solenoid circuit by means of a third normally open limit switch in a holding circuit which has been closed by the movement of the solenoid core in rotating the sleeve and the still closed switch controlled by the movement of the pivotal head which is maintained in its operative position during the retraction of the plunger. When the plunger is fully retracted, the molding material drops through the registered openings in front of the plunger. The pivotal head is then rocked to its non-operative position, which permits the switch controlled thereby to return to its normally open position, thus opening the solenoid holding circuit and permitting a spring to retract the solenoid core and thereby rotating the sleeve to move its aperture out of register with the cylinder aperture and hopper outlet and it remains in this position until the plunger again reaches its extreme forward position to actuate the limit switch controlled thereby and the operating cycle is repeated.

Other objects and advantages of the invention will be apparent from the following detailed description taken in conjunction with the accompanying drawings, in which:

Fig. 1 is a fragmentary side view, partly in section and somewhat diagrammatic, of an extrusion apparatus embodying the features of the invention, the extruding plunger and nozzle being shown in their extreme retracted positions;

Fig. 2 is an enlarged fragmentary view of Fig. 1, partly in section, the extruding plunger and nozzle being shown in their extreme advanced positions and the rotatable sleeve aperture in communication with the hopper outlet for depositing a supply of material in front of the plunger when it is next fully retracted;

Fig. 3 is a greatly enlarged fragmentary view of Fig. 2 in section;

Fig. 4 is a vertical section taken on the line 4—4 of Fig. 3;

Fig. 5 is an enlarged fragmentary vertical section taken on the line 5—5 of Fig. 1 and showing the rotatable sleeve operated to the position shown in Fig. 2;

Fig. 6 is an enlarged end elevation, partly in section, taken on the line 6—6 of Fig. 1; and Fig. 7 is a diagrammatic view of the electrical circuit for automatically controlling the feeding of the granular molding material from the hopper into the extrusion cylinder when the plunger reaches its extreme forward position.

An electrical contact plug, which is shown partially assembled in Figs. 2, 3 and 4 and indicated generally by the numeral 10, is one example of an article, in the production of which the present extrusion apparatus may be used advantageously. The plug 10 is of the three-conductor type comprising, as shown, an outer tubular metal casing member 11 formed with an inner end portion 12 which is cut away at 13 and an opposite outer end portion 14 of reduced diameter, a shoulder being formed at 15. Within the member 11 is a second tubular metal member 17 having an enlarged collar 18 at its outer end, an inner end 19 being solid and semi-circular in cross-section. Between the tubular portion of the member 17 and the end portion 19, the member is cut away to provide an open semi-circular portion 20. Fitted on the member 17 and abutting the inner face of the collar 18 is a collar 21 of insulating material. Between the inner and outer diameters of the tubular members 11 and 17 is a sleeve 24 of insulating material, which abuts at its outer end the collar 21, the inner end of the sleeve being cut away to follow substantially the cut away portion 13 of the member 11. Within the member 17 is a metal rod 25 having its outer end threaded at 26 and its inner end shaped into a rectangular plate-like portion 27, which is displaced in one direction from the longitudinal axis of the rod and formed with a threaded aperture 28. Also included in the plug 10 during the extruding operation are insulating collars 29 and a metal collar 30 therebetween, all surrounding the rod 25. The manner of mounting the collars 29 and 30 on the rod 25 will be described hereinafter.

That portion 27 of the rod 25 which is arranged along the cut away portion 13 of the member 11 and, therefore, the aperture 28, which is used in the completed plug for the connection of a conductor, is accessible and used for attaching a die member 31 which will be described hereinafter. The diameter of the metal rod 25 is slightly less than the inner diameter of the tubular metal member 17 and, to electrically insulate the same, the resultant space is filled with thermoplastic insulating material 32 in the operation of the apparatus of this invention. The space around the plate-like portion 27 of the rod 25 and the adjacent end of the cut away portion 13, as indicated at 33, is also filled and sealed with the insulating material. The upper face of the plate-like portion 27 and the aperture 28, as viewed in Fig. 3, is left exposed when the die member 31 is removed and the outer exposed face of the insulating material suitably molded.

The extrusion apparatus of this invention, indicated (Fig. 1) in general at 40, the die member 31 and a fixture 41 for holding the plug 10 during the extruding operation are used in feeding, extruding and molding the insulating material 32, which, in the present instance, is a thermoplastic material between the member 17 and rod 25 of the plug 10 and at the points above described.

Referring particularly to Fig. 1, a main support or table is indicated at 45 having secured thereon a U-shaped bracket 46 between vertical arms 47 of which is pivoted, at 48, an extrusion head 49. Arranged in and peripherally spaced from the wall of a vertically disposed bore 52 in the head 49 is a plastic material deflector unit 53. The bore 52 communicates with a horizontally disposed bore 54 in the head 49, in which is fixed an extrusion cylinder 55, having an opening 56 communicating with a bottom outlet of a tapered hopper 59 carried on the head, the hopper containing granular thermoplastic molding material 60. The left end of the cylinder 55 (Fig. 2) is counter bored and rotatably fitted therein and in the bore 54 is a shouldered sleeve 61 having an opening 62 registerable periodically with the cylinder opening 56 and the hopper outlet when the sleeve is rotated to the position shown in Fig. 5 in a manner to be described hereinafter.

Reciprocable in the cylinder 55 is an extrusion plunger 63 connected to a piston 64 (Fig. 1), slidable in a cylinder 65, which is secured to and movable with the head 49 by means of a base plate 66, the cylinder having ports 68 and 69 at opposite ends which alternately serve as inlet and outlet ports for compressed and expended air during an operating cycle of the apparatus. Connected to the ports 68 and 69 are air lines 70 and 71, respectively, which, in turn, are connected to a control valve 70 communicating with a source of air under pressure (not shown) by a line 73. Also connected to the valve 70 are air lines 74 and 75, which are connected to opposite ends of a cylinder 76 by means of ports 77 and 78 in the cylinder whereby a piston 81, slidable in the cylinder, may be moved in opposite directions, the ports alternately serving as inlet and outlet ports for compressed and expended air during an operating cycle of the apparatus. An exhaust line for the expended air is indicated at 82. Connected to the piston 81 is a piston rod 83, which is pivotally connected at its upper end, as indicated at 84, to the pivotal extrusion head base plate 66. By moving a pivotal hand lever 85 of the valve 70 through a predetermined arc of travel and then back to its normal position, a plurality of cams 86 attached to a rod 87 movable with the lever actuate cooperating valve plungers 89 to automatically control the supply of compressed air through the valve 70 to the cylinders 65 and 76 in timed relation to rock the extrusion head 49 about its pivot 48 in a clockwise direction, as viewed in Fig. 1, to the position shown in Fig. 2 and to move the extrusion plunger 63 toward the deflector unit 53 at the right or forward end of the head and thereafter retract the parts to their original position (Fig. 1). The details of the control valve 70 have been omitted for the sake of simplicity since they are not believed necessary to a complete understanding of this invention and it is obvious that other types of controls may be substituted to control the operation of the apparatus.

In the forward movement of the extrusion plunger 63, the granular thermoplastic material 60, dropped periodically into the cylinder 54 in front of the plunger by the action of gravity from the hopper 59, is advanced subsequently to the deflector unit 53. That portion of the head 49 surrounding the unit 53 is heated by a plurality of electrical heating units 90 entered in the head and connected to a source of electrical energy by conductors 91. The head 49 is heated and to a degree sufficient to plasticize the granular molding material 60 in its passage to and along the deflector unit 53, which is so formed peripherally at each end, as indicated at 92, that the material is directed from the bore 54 into the bore 52 and along the annular space surrounding the deflector unit 53. Threaded into the lower shouldered end of the bore 52 is a nozzle 93, the inner and outer peripheries of the nozzle and deflector tapering toward an orifice 96 in the nozzle. When the head 49 has been rocked to its operative position (Fig. 2), a lower rounded end 97 of the nozzle 93 engages in a similarly shaped depression 98 in the die member 31, the nozzle orifice 96 being in sealed communication with an aperture 99 in the die member. The die member 31 is removably attached to the plug 10 by a hand screw 100 loosely carried in the die member, the screw being threaded into the aperture 28 of the plate-like portion 27 of the plug rod 25 which serves to clamp the cylindrical spaced portions 12 of the plug up against suitable shaped portions of a lower die surface 103 of the die member and to accurately position and support the inner end of the rod 25 during the extrusion of the material 32.

The fixture 41 for holding the plug 10 and the attached die member 31 during the extruding operation comprises a standard 105 slidable laterally of the head 49 on the base 45 from a loading position, which is shown in fragmentary dotted outline to its full line position in alignment with the nozzle 93 (Fig. 6). Suitable ways 106 are provided for guiding the standard 105 and spaced stop members 107 serve to limit its movement in opposite directions and it carries a handle 108 to facilitate the movement thereof. The upper surface of the standard 105 at its right end (Figs. 3 and 4) is so shaped that the lower half of the plug 10 snugly fits therein and an inner annular shoulder 109 on a generally circular bored enlargement 110 at the left end of the standard provides a stop surface against which the left end of the plug portion 12 is clamped by a suitable cam face 113 (Figs. 3 and 6) formed on a hand lever 114 pivoted at 115 to the right end of the standard 105. After positioning the plug 10 on the upper surface of the standard 105 and against the shoulder 109, the lever 114 is rocked counterclockwise from its dotted outline position to the full line position (Fig. 6), during which the cam face 113 engages the periphery of the plug portion 12 and carries it forward and downward to clamp it to the standard.

Upon the plug 10 being locked to the standard 105, as above described, a hand wheel 116 is mounted in position upon the standard 105, as shown in Fig. 3, the wheel being provided with a shouldered bore 117 extending from the left end of the wheel to the right end of a reduced portion 120 thereof. The diameter of the greater portion of the length of the bore 117 is such that it will snugly receive the outer end portion 14 of the tube 10 extending freely along and from the outer end of the bore of the standard enlargement 110, the outer end of the plug rod 25 freely extending through the reduced portion of the bore 117. The outer and inner peripheries of the wheel portion 120 and standard enlargement 110 are formed with intermeshing coarse pitch screw threads 121 whereby the hand wheel 116 may be quickly mounted in position or removed. The previously mentioned plug collars 29 and 30 are inserted into the bore 117 of the hand wheel 116 instead of threading them onto the plug rod 25 which serves to facilitate the mounting of the plug 10 on the standard 105 and the insertion of the outer end of the plug into the bore of the enlargement 110. The diameters of the collars 29 and 30 are the same as that of the plug portion 14, which is snugly received in the bore 117 of the hand wheel. Thus, the threading of the wheel 116 into the enlargement 110 threads the collars 29 and 30 onto the rod 25 and clamps them against the collar 18 on the tubular metal member 17, which is abutting the insulating collar 21, the left end of the outer end portion 14 of the metal casing 11 serving as a stop surface for the several collars. The outermost collar 29 has an inner diameter, as shown in Fig. 3, which very snugly fits the diameter of the rod 25 and thus the rod is accurately centered and supported at its outer end in the tubular metal member 17, the inner end of the rod being accurately centered and supported by the die member 31 in the manner previously described. The outermost collar 29 also serves as a seal to prevent the material 32 during the extrusion operation from passing beyond the inner face of the collar.

The previously mentioned periodic rotation of the sleeve 61 which surrounds the extrusion plunger to admit a charge of granular molding material 60 into the cylinder 55 in front of the plunger 63 is effected in the following manner: Keyed to the outer end of the sleeve 61 is a crank disk 122 (Figs. 1, 2 and 5) to the outer flat face of which is pivotally connected at 123 one end of a crank arm 124. The opposite end of the crank arm 124 is pivotally connected at 127 to a core 128 of a solenoid 129. A coiled tension spring 131 connected at opposite ends to the core 128 at its pivot 127 and to the base plate 66 acts, when the solenoid is deenergized, to pull the core 128 downwardly and thereby through the crank arm 124, rotating the crank disk 122 to the position shown in Fig. 1. In this position of the disk 122, the opening 62 in the sleeve 61 is not registered with the extrusion cylinder opening 56. When the solenoid 129 is energized, the core 128 is drawn upwardly and through the described connections the sleeve 61 is rotated and the opening 62 therein is registered with the cylinder opening 56, as shown in Figs. 2 and 5.

Attached, respectively, to the support 45, base plate 66 and solenoid 129 are normally open suitable type limit or micro-switches 134, 135 and 136 of a standard commercial type having roller actuated operating members 137, 138 and 139, respectively. Carried on the piston rod 83, plunger 63 and solenoid core 128 are switch actuating cam members 142, 143 and 144 for engaging the switch actuating members 137, 138 and 139, respectively.

In the operation of the apparatus, it will be assumed that a plug 10 has been arranged on the fixture 41 in alignment with the nozzle 93 in the manner previously described, and, as shown in Fig. 1, and further that, as shown, the feed sleeve aperture 62 is not registered with the cylinder aperture 56 and hopper outlet and the plunger 63 and head 49 are in their fully retracted positions, the cylinder 55 being shown partially filled with molding material 60. By rocking the hand lever 85 through a predetermined arc of travel and then back to its normal position, air pressure is admitted in timed relation into the cylinders 76 and 65 to first rock the extrusion head 49 clockwise about its pivot 48 to carry the nozzle 93 into operative relation with the die member 31, as shown in Figs. 2 and 3. Immediately thereafter the plunger 63 is advanced to the right and the plastic material is extruded through the nozzle 93 into the plug 10, as described hereinbefore, the parts thereafter being returned to the positions shown in Fig. 1. It will be apparent that as the supply of material 60 in the cylinder 55 diminishes with each successive extruding operation, the plunger 63 will be stepped further to the right at the end of each operation. Upon the plunger 63 reaching its extreme forward position (Fig. 2), the cam member 143 actuates the switch actuating member 138 (Figs. 2 and 7) to close the normally open limit switch 135. At this time, the piston rod 83 is in its upper position since the head 49 is in its lowered operative position and, consequently, the cam member 142 (Figs. 1 and 7) on the rod 83 has actuated the switch actuating member 137 to close the normally open limit switch 134. Thus, whenever the switch 135 is closed, at which period the switch 134 will also be closed, a circuit (Fig. 7) which includes a battery 145, or other source of electrical energy and the three limit switches 134, 135 and 136 and the solenoid 129, all suitably connected in the circuit, is completed through the solenoid. The solenoid 129 is thus energized and its core 128 drawn upwardly (Figs. 2, 5 and 7) and the cam member 144 carried by the core actuates the switch actuating member 139 to close the normally open limit switch 136.

This upward movement of the core 128, in the manner previously described, rotates the feed sleeve 61 and registers the sleeve aperture 62 with the cylinder aperture 56 and the hopper outlet. The plunger 63 is then retracted to its initial starting position (Fig. 1) to the left of the registered apertures 56 and 62 and hopper outlet which permits a charge of material 60 from the hopper to drop into the cylinder 55 in front of the plunger. As the plunger 63 is retracted, the cam member 143 carried thereon permits the limit switch 135 to open. This takes place before the head 49 is rocked counter-clockwise from its operative position (Fig. 2) to its retracted position (Fig. 1) which is effected by a downward movement of the piston rod 83 and the limit switch 134 is thus held closed by the cam member 142 and, therefore, the solenoid 129 remains energized through the holding circuit which includes the closed limit switch 136, although the limit switch 135 has been opened. The head 49 is then rocked counter-clockwise to the position shown in Fig. 1, which permits the limit switch 134 to open and this opens the circuit through the solenoid. Upon deenergization of the solenoid, the spring 131 attached to the core 128 thereof draws the core downwardly and, through its connections to feed sleeve 61, the latter is rotated to move its aperture out of communication with the cylinder aperture 56 and the hopper outlet. The apparatus has now been operated to the position shown in Fig. 1 and during subsequent cycles of operation, the feed sleeve 61 remains in its last described position until the charge of material 60 entered into the cylinder 55 is so diminished that the plunger 63 again reaches its extreme forward position (Fig. 2) whereupon the limit switch 135 controlled thereby is actuated and another charge of material 60 is dropped into the cylinder. During each of the operating cycles between the periodic charging of the cylinder, it will be understood that the limit switch 134 is closed but the solenoid 129 is not energized since the limit switch 135 has to be closed to complete the circuit.

It will be understood that the embodiment herein described is merely illustrative of the invention and one application thereof and that modifications can be made and it is capable of other applications.

What is claimed is:

1. An extrusion apparatus comprising a mold, an extrusion cylinder having a capacity of a plurality of mold charges and a laterally arranged aperture for entering molding material thereinto, a rotary sleeve in said cylinder arranged in one position to close said aperture and having an aperture alignable with said cylinder aperture in another position to open said latter aperture, a piston for charging material from the cylinder to the mold, and means for rotating said sleeve to align its aperture with said cylinder aperture for supplying material to the cylinder when there is insufficient material therein for another charge, said means being responsive to a predetermined forward position of the piston.

2. An extrusion apparatus comprising a mold, an extrusion cylinder having a capacity of a plurality of mold charges and a laterally arranged aperture for entering molding material thereinto, a rotary sleeve in said cylinder for closing said cylinder aperture, a piston for charging material from the cylinder to the mold, an electric circuit including a solenoid and core, operating connections between the core and said rotary sleeve, a circuit controlling switch, and means including a member movable with said piston effective when the piston reaches a predetermined forward position to actuate said switch to cause said core to move and thereby move said sleeve to open said cylinder aperture for supplying material to the cylinder in front of the piston upon retraction thereof.

3. An extrusion apparatus comprising a mold, a pivotal extrusion cylinder having a capacity of a plurality of mold charges and a laterally arranged aperture for entering molding material thereinto, a nozzle movable with said cylinder for operative relation with said mold, a movable member for closing said aperture, a piston for charging material from the cylinder through the nozzle and to the mold, an electric circuit including a solenoid and core movable with said cylinder, operating connections between the core and said movable member, normally open circuit controlling switches, means movable with said pivotal cylinder and on said piston effective when the nozzle is in its operative position and the piston reaches a predetermined forward position to close said switches to energize the solenoid and cause said core to move and thereby move said member to open said cylinder aperture for supplying material to the cylinder in front of the piston upon its retraction, a normally open circuit controlling switch movable with said solenoid, means responsive to the movement of said core for closing said latter switch to hold said solenoid energized and thereby said member in its last mentioned position until the piston is retracted, one of said other switches being opened in the retraction of the piston and the other switch being held closed while the nozzle is in its operative position, and means for returning said core to its retracted position upon said nozzle moving to its inoperative position during which movements said other switches are opened.

4. An extrusion apparatus comprising a mold, an extrusion cylinder having a capacity of a plurality of mold charges and a laterally arranged aperture for entering molding material thereinto, a movable sleeve in said cylinder arranged in one position to close said aperture and having an aperture alignable with said cylinder aperture in another position to open said latter aperture, a piston for charging material from the cylinder to the mold, and variably operable means operatively responsive to a predetermined forward position of the piston for moving said sleeve to align its aperture with said cylinder aperture for supplying material to the cylinder when there is insufficient material therein for another charge.

5. An extrusion apparatus comprising a mold, an extrusion cylinder having a capacity of a plurality of mold charges and a laterally arranged aperture for entering molding material thereinto, a movable sleeve in said cylinder for closing said cylinder aperture, a piston for charging material from the cylinder to the mold, an electric circuit including a solenoid and core, operating connections between the core and said movable sleeve, a circuit controlling switch, and means including a member movable with said piston effective when the piston reaches a predetermined forward position to actuate said switch to cause said core to move and thereby move said sleeve to open said cylinder aperture for supplying material to the cylinder in front of the piston upon retraction thereof.

ALBERT L. SINCLAIR.
LADISLAV STASTNEY.